June 13, 1933.   W. J. SIMONDS   1,914,048
GUDGEON LOCKING DEVICE
Filed Feb. 20, 1931

Inventor
Warren J. Simonds
By Attorneys
Southgate Fay & Hawley

Patented June 13, 1933

1,914,048

UNITED STATES PATENT OFFICE

WARREN J. SIMONDS, OF ORANGE, MASSACHUSETTS, ASSIGNOR TO RODNEY HUNT MACHINE COMPANY, OF ORANGE, MASSACHUSETTS, A CORPORATION OF MASSACHUSETTS

GUDGEON LOCKING DEVICE

Application filed February 20, 1931. Serial No. 517,350.

This invention relates to gudgeons used at the ends of wooden rolls used in textile and other machinery.

The principal object of the invention is to provide means for preventing the loosening and possible dislodgment of the separate wedges which are usually used in connection with metal gudgeons and also to provide the locking means in a form in which no extra parts are required and practically no extra cost.

Other objects and advantages of the invention will appear hereinafter.

Reference is to be had to the accompanying drawing, in which

Figure 1:
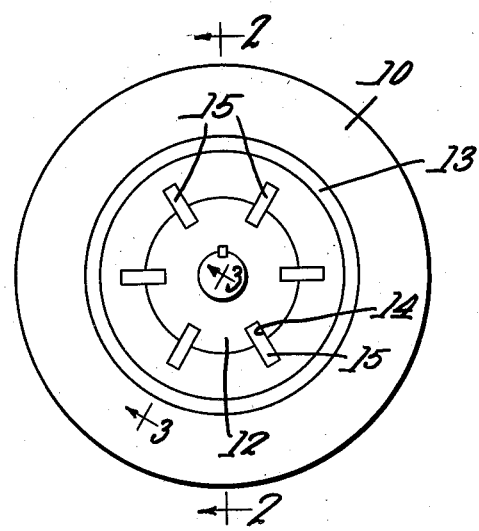
Fig. 1 is an end view of a roll showing a gudgeon with separate wedges for holding it in position.
Figure 2:
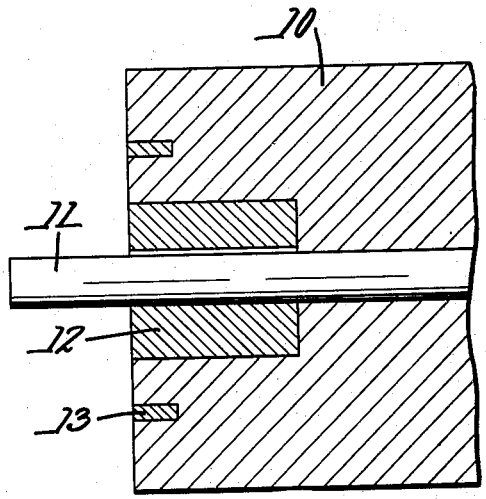
Fig. 2 is a sectional view on the line 2—2 of Fig. 1.
Figure 3:
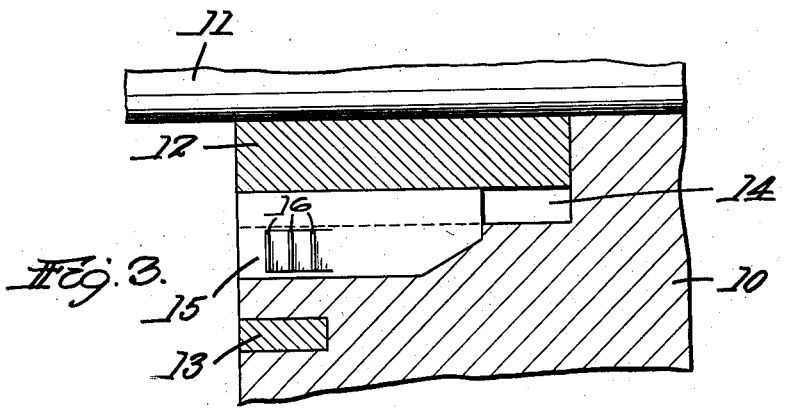
Fig. 3 is a radial sectional view on the line 3—3 of Fig. 1, showing details of this invention.
Figure 4:
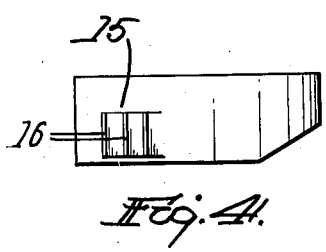
Fig. 4 is a side view of one of the wedges.
Figure 5:
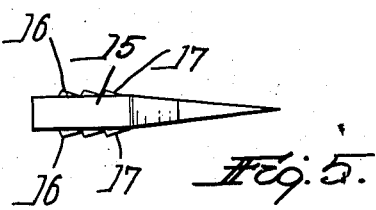
Fig. 5 is an edge view of the same.

Sometimes, in this class of wood rolls, the gudgeon itself has been provided with integral wings set into recesses in the ends of the wood but it is also common to provide cylindrical gudgeons with longitudinal slots along the surface and to drive metal wedges into the end of the wood. A portion of each wedge of course is located in the groove or slot in the surface of the gudgeon. The difficulty with the separate wedges is that they work loose as the roll is subjected to hard usage. The loosening of the wedges results in loosening the gudgeon. This invention is designed to preserve the original tightness by keeping the wedges from working loose.

In the drawing, I have shown a wooden roll 10 on a shaft 11 with a metal gudgeon 12 extending around a shaft and a ring 13 spaced from the gudgeon. In this case the gudgeon 12 is provided with a series of longitudinal slots 14 into which metal wedges 15 are driven, of course also being driven along these grooves into the grain. Each wedge is produced with a number of herringbone ridges 16 tending to prevent the wedge from moving outwardly toward the end of the roll. The herringbone ridges have long sloping surfaces 17 on the entering side of the wedge, providing for comparatively easy entrance of the wedge into the end of the roll. The other side of each herringbone ridge is at a much steeper slope, thereby providing resistance to the wedge loosening or moving out, i. e. in the opposite direction to that in which it is driven. In the past the lack of anchorage has been the cause of its working loose, with the ultimate loosening of the gudgeon and premature failure of roll. Thus the wedge will be firmly locked in position. This prevents the accidental loosening of the wedge and thereby prevents the gudgeon from getting loose even under the hardest usage.

The ridges are easily formed on the wedge without machining and without adding materially to the cost of these parts. There is no special difficulty about inserting the wedges and when the device is completed by the introduction of all the wedges, it is practically as firm as a gudgeon provided with integral wings.

Although I have illustrated and described only one form of the invention, I am aware of the fact that modifications can be made therein by any person skilled in the art without departing from the scope of the invention as expressed in the claims. Therefore, I do not wish to be limited to all the details of construction herein shown and described, but what I do claim is:

1. As an article of manufacture, a gudgeon for the end of a roll having longitudinal slots and wedges located in said slots and projecting beyond the gudgeon, said wedges having transverse ridges beyond the gudgeon for preventing dislodgement of the wedges.

2. As an article of manufacture, a gudgeon adapted to be located in the end of a roll, the gudgeon having slots, and wedges adapted to drive into said slots, said wedges having ridges, each with a long slant on the inner side and an abrupt slant on its outer side, whereby, when the wedge is driven in, the ridges will present a means for preventing the wedges from working out.

3. As an article of manufacture, a wedge for the purpose described having a smooth portion from end to end and a portion beyond the smooth portion having transverse ridges, for the purpose described.

In testimony whereof I have hereunto affixed my signature.

WARREN J. SIMONDS.